（12）United States Patent
Koyo et al.

US007524783B2

(10) Patent No.: US 7,524,783 B2
(45) Date of Patent: *Apr. 28, 2009

(54) GLASS FOR LASER PROCESSING

(75) Inventors: Hirotaka Koyo, Osaka (JP); Tadashi Koyama, Osaka (JP); Keiji Tsunetomo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/262,864

(22) Filed: Oct. 3, 2002

(65) Prior Publication Data
US 2003/0100431 A1 May 29, 2003

(30) Foreign Application Priority Data
Oct. 5, 2001 (JP) .......................... P2001-309439

(51) Int. Cl.
C03C 3/089 (2006.01)
C03C 3/064 (2006.01)
C03C 3/062 (2006.01)

(52) U.S. Cl. ............................. 501/65; 501/77; 501/66; 501/68; 501/69; 501/73

(58) Field of Classification Search ................... 501/55, 501/65, 66, 68, 69, 73, 77; 65/392
See application file for complete search history.

(56) References Cited

U.S. PATENT DOCUMENTS

| 3,898,093 | A | * | 8/1975 | Faulstich et al. ............... 501/64 |
| 4,367,919 | A | * | 1/1983 | Tung et al. .................... 359/538 |
| 4,526,874 | A | * | 7/1985 | Grabowski geb. Marszalek et al. ............................ 501/77 |
| 4,734,389 | A | * | 3/1988 | Grabowski et al. ............. 501/73 |
| 5,285,517 | A | * | 2/1994 | Wu ............................. 385/142 |
| 5,300,467 | A | * | 4/1994 | Ishizaki et al. ................. 501/67 |
| 5,902,665 | A |   | 5/1999 | Kuroda |
| 5,951,731 | A | * | 9/1999 | Tsunetomo et al. ............. 65/61 |
| 5,981,015 | A | * | 11/1999 | Zou et al. .................... 428/64.2 |
| 5,997,977 | A | * | 12/1999 | Zou et al. .................... 428/64.1 |
| 6,111,697 | A |   | 8/2000 | Merrill et al. |
| 6,214,429 | B1 | * | 4/2001 | Zou et al. .................... 428/64.1 |
| 6,220,058 | B1 | * | 4/2001 | Koyama et al. ................ 65/392 |
| 6,306,786 | B1 | * | 10/2001 | Koyama et al. ................ 501/69 |
| 6,376,402 | B1 | * | 4/2002 | Pannhorst et al. .............. 501/66 |
| 6,376,403 | B1 | * | 4/2002 | Koyama et al. ................ 501/69 |
| 6,451,720 | B1 | * | 9/2002 | Kishimoto et al. ............. 501/64 |
| 6,562,523 | B1 | * | 5/2003 | Wu et al. ....................... 430/5 |
| 6,729,161 | B1 | * | 5/2004 | Miura et al. ................... 65/390 |
| 2002/0027655 | A1 |   | 3/2002 | Kittaka et al. |
| 2002/0122613 | A1 |   | 9/2002 | Kittaka et al. |
| 2005/0233889 | A1 | * | 10/2005 | Koyo et al. .................... 501/66 |

FOREIGN PATENT DOCUMENTS

| DE | 43 06 004 | | 9/1993 |
| JP | 06-115969 | | 4/1994 |
| JP | 09-100137 | | 4/1997 |
| JP | 10-029832 | | 2/1998 |
| JP | 11-217237 | | 8/1999 |
| JP | 2000-044279 | | 2/2000 |
| JP | 2000-143285 | | 5/2000 |
| JP | 2001114531 A | * | 4/2001 |
| WO | WO 97/35811 | | 10/1997 |
| WO | 99/36171 | * | 7/1999 |

OTHER PUBLICATIONS

Derwent Abstract 2001-608631 of JP 2001-114531 and US 6,451720.*
European Search Report dated Aug. 19, 2003.
XP-002251613 from Derwint Publications dated Apr. 24, 2001.
XP-002251614 from Derwint Publications dated Nov. 8, 2001.
P. St. J. Russell, "Optics of Floquet-Bloch Waves in Dielectric Gratings", Applied Physics B. 39, 231-246 (1986).
K. Shiraishi, et al., "Spatial walk-off polarizer utilizing artificial anisotropic dielectrics", Optics Letters, vol. 15 No. 9, May 1, 1990.
J. D. Joannopoulos, et al., "Photonic Crystals: Molding the Flow of Light", Princeton University, 1995.
W. M. Robertson, et al., Measurement of Photonic Band Structure in a two-dimensional Periodic Dielectric Array, Physical Review Letters, vol. 68, No. 13, p. 2023-2026, Mar. 30, 1992.
K. Sakoda, "Symmetry, degeneracy and uncoupled modes in two-dimensional photonic lattices", Physical Review B, vol. 52, No. 11, p. 7982-7986, Sep. 15, 1995.
H. Kosaka, et al., "Superprism phenomena in photonic crystals", Physical Review B, vol. 58, No. 16, p. R10096-R10099, Oct. 15, 1998.
The Office Action issued on Apr. 17, 2007, during prosecution of the corresponding Japanese patent application No. 2001-309439, with English language trnalation, pp. 1 to 7.
The Office Action issued on Jul. 23, 2007, during prosecution of the corresponding Japanese patent application No. 2001-309439, with English language trnalation, pp. 1 to 6.

* cited by examiner

*Primary Examiner*—Karl E Group
*Assistant Examiner*—Elizabeth A Bolden
(74) *Attorney, Agent, or Firm*—Whitham Curtis Christofferson & Cook, PC

(57) ABSTRACT

Titanium is added in the form of atoms, a colloid, or ions to a glass to be subjected to laser processing in which the ablation or vaporization caused by the energy of an absorbed laser light is utilized. Since titanium can be incorporated into the glass through melting, the threshold value for processing can be easily regulated by changing the amount titanium to be added and a material having evenness in processability can be obtained.

2 Claims, 2 Drawing Sheets

GLASS FOR LASER PROCESSING

BACKGROUND OF THE INVENTION

The present invention relates to the laser processing of a glass by laser light irradiation. More particularly, the invention relates to a glass composition suitable for laser processing.

Members obtained through the microprocessing of a glass base, such as optical parts for use in optical communication and microlenses to be mounted in displays, are used in a wide range of fields. This microprocessing of a glass base has generally been conducted by wet etching (chemical etching) with an etchant such as, e.g., hydrofluoric acid or dry etching (physical etching) such as, e.g., reactive ion etching.

However, the wet etching has problems concerning the compositional regulation of etchants and the treatment of waste liquids. The dry etching has problems that a vacuum apparatus or the like is necessary and that the processing is not efficient because of the necessity of complicated steps, e.g., the step of forming a pattern mask by photolithography.

On the other hand, the technique of direct processing is progressing in which a laser light is caused to strike on a work to cause a physical change such as heating, melting, vaporization, or ablation and this change is used to process the work. Since a laser light can be focused to an extremely small spot, it is suitable for use in microprocessing. This is a completely physical processing technique and is hence free from the problems accompanying the wet etching. Furthermore, since this laser light processing can be conducted in air with laser light scanning, it is also free from the problems accompanying the dry etching heretofore in use.

With the progress of laser technology, reductions in laser pulse duration and reductions in wavelength have realized and it has become possible to process organic materials, e.g., polyamides, and metals on the order of micrometer. However, since glasses are brittle materials, they are apt to crack during processing. It has hence been not easy to use a laser light for the microprocessing of glass materials.

For example, Japanese Patent Laid-Open No. 217237/1999 discloses, for eliminating those problems, a technique for providing a glass less apt to crack by incorporating silver into a glass by ion exchange and thereby reducing the threshold value for laser processing.

However, in most glasses containing alkali metals, the following phenomenon occurs. Although silver ions can be incorporated into the glass through silver ion exchange, the silver ions are reduced in an area near the glass surface and the diffusion of silver ions into inner parts of the glass is thus inhibited. Because of this, the effective region for laser processing is limited to the area near the glass surface and it is hence still difficult to conduct processing of the glass up to an inner part thereof, e.g., formation of a through-hole in the glass plate. There has also been a problem that the rate of ion exchange is low and it is difficult to cause ions to stably reach inner parts of the glass.

An aim of the invention is to provide, in order to eliminate the problems described above, a glass for laser processing which contains an element capable of being incorporated not through ion exchange but at the time of glass melting and serving to lower the threshold value for processing.

SUMMARY OF THE INVENTION

The invention provides a glass to be subjected to laser processing in which the ablation or vaporization caused by the energy of an absorbed laser light is utilized, the glass containing titanium in the form of atoms, a colloid, or ions.

This glass preferably has a composition satisfying the following relationships:

$20 \leq SiO_2 + B_2O_3 \leq 79$ mol %

$1 \leq Al_2O_3 + TiO_2 \leq 40$ mol %

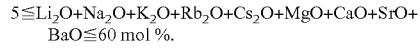
$5 \leq Li_2O + Na_2O + K_2O + Rb_2O + Cs_2O + MgO + CaO + SrO + BaO \leq 60$ mol %.

In this composition, it is essential that the $TiO_2$ content be from 1 to 40 mol % (preferably from 5 to 25 mol %).

Upon absorption of a laser light, the glass having the composition described above changes in glass structure or in absorptivity and thereby undergoes ablation or vaporization. By utilizing this phenomenon, a glass having a lowered threshold value for processing is obtained which can be processed so as to remove a specific part thereof with a smaller amount of energy. The glass for laser processing of the invention can be easily subjected not only to a processing operation for processing an area near the glass surface but also to a processing operation for processing the glass up to an inner part thereof, e.g., formation of a through-hole in the glass plate.

The present disclosure relates to the subject matter contained in Japanese patent application No. P2001-309439 (filed on Oct. 5, 2001), which is expressly incorporated herein by reference in its entirety.

DESCRIPTION OF THE PREFERRED EMBODIMENT

The glass of the invention can have improved laser processability, i.e., the glass can be processed from the surface to an inner part thereof with a smaller energy amount. As an index to such laser processability was used threshold value for the processing of a surface and an inner part of the glass.

Figure 2:
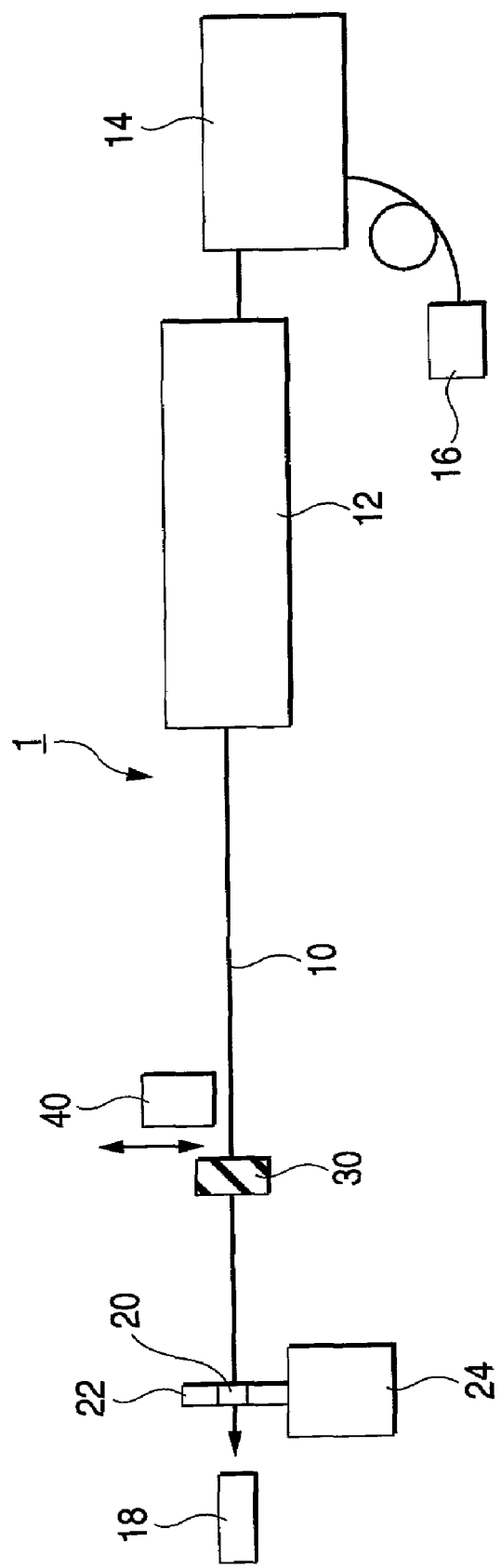
FIG. 2 is a diagrammatic view illustrating an optical system for measuring threshold value for laser processing.

Threshold values for processing were determined with the optical system 1 shown in FIG. 2. As a laser light 10 was used as an ultraviolet light consisting of the third harmonic (wavelength: 355 nm) and fourth harmonic (wavelength: 266 nm) from an Nd:YAG laser. This laser light had a pulse frequency of 20 Hz and a pulse duration of from 5 to 8 ns. The laser light was focused with a lens (not shown) having a focal distance of 100 nm and caused to strike on a glass sample 20 fixed to a sample holder 22 on a sample stage 24 The time period of irradiation was regulated to 2 seconds with an irradiation shutter 30.

The energy of the laser light was measured with a power meter 40 placed in the path of the laser light, while keeping the irradiation shutter closed. The sample was irradiated at various levels of the laser light energy to determine the minimum energy at which ablation occurred. This energy level was taken as the threshold value for processing.

Since the laser 12 generates a high-energy beam, it is made capable of being remote-controlled for safety so that a device 14 for feeding power and cooling water to the laser 12 is operated by a remote controller 16. The laser 12 itself also has a built-in shutter, although it is not shown in the figure, and this shutter also can be remote-controlled. The laser beam which has passed through the sample 20 is absorbed by a beam damper 18.

Glasses for laser processing were produced by mixing given raw materials, melting the mixture in an electric furnace, and gradually cooling the melt. The glass blocks obtained were cut and polished by general methods. Thus, platy glass test samples for laser processing which had a smooth surface were prepared.

The invention will be explained below by reference to Examples thereof, but the invention should not be construed as being limited to these Examples.

EXAMPLES

In Table 1 are shown the compositions of the laser processing glasses of Examples 1 to 18 according to the invention. The compositions employed in Examples 1 to 5 were ones in which the amounts of intermediate oxides were varied. The compositions employed in Examples 6 to 8 were the same as in Example 5, except that the amounts of network-former oxides were changed without changing the $TiO_2$ amount. In Examples 9 and 10 were employed compositions which were the same as in Example 5, except that the amount of a modifying oxide to be added was changed without changing the $TiO_2$ amount. In Examples 11 and 12 were employed compositions in which the amounts of $SiO_2$ as a network-former oxide and $TiO_2$ as an intermediate oxide were changed considerably. In Examples 13 to 18 were employed compositions which were the same as in Example 5, except that the kind of modifying oxide was varied without changing the TiO amount.

The content of each component is within the following range in terms of mol %.

Network-former oxides ($SiO_2$, $B_2O_3$): 20.0-79.0
Intermediate oxides ($Al_2O_3$, $TiO_2$): 1.0-40.0
It is essential that $TiO_2$ be contained in an amount of from 1.0 to 40.0 mol %.
Modifying oxides ($Li_2O$, $Na_2O$, $K_2O$, $Rb_2O$, $Cs_2O$, MgO, CaO, SrO, BaO): 5.0-60.0

The glass for laser processing of the invention may contain slight amounts of impurities and consists substantially of those ingredients. As long as the compositional ranges shown above are satisfied, all those ingredients, except $TiO_2$, need not be contained.

In the glass having the composition shown above, a glass framework can be maintained when the glass contains $SiO_2$ or $B_2O_3$, which is a network-former oxide, in an amount of from 20 to 79 mol %. $Li_2O$, $Na_2O$, $K_2O$, $Rb_2O$, $Cs_2O$, MgO, CaO, SrO, or BaO, which is a modifying oxide, destroys part of the network structure of the glass. These modifying oxides are hence ingredients used for reducing high-temperature viscosity or reducing viscosity change with temperature. As long as the modifying oxides are added in an amount within the range of from 5 to 60 mol % according to the invention, a glass can be produced. $Al_2O_3$ or $TiO_2$, which is an intermediate oxide, can be present either a network-former oxide or a modifying oxide in the glass according to a balance between $SiO_2$ or $B_2O_3$ as a network-former oxide and $Li_2O$, $Na_2O$, $K_2O$, $Rb_2O$, $Cs_2O$, MgO, CaO, SrO, or BaO as a modifying oxide. In particular, $TiO_2$ as an intermediate oxide is an essential ingredient for lowering the threshold value for laser processing.

Each of the glass samples for laser processing which had been produced so as to have the compositions shown above was irradiated with the laser light having a wavelength of 266 nm while changing the irradiation energy. The threshold values for surface processing thus obtained are shown in Table 2. The same experiment was conducted with the laser light having a wavelength of 355 nm. The threshold values for surface processing thus obtained are shown in Table 3.

In the experiment in which the samples were irradiated with the laser light having a wavelength of 266 nm, the minimum power measurable with the power meter was 15 mW, so that comparisons among the samples having a threshold value not higher than that were impossible. In the experiment in which the samples were irradiated with the laser light having a wavelength of 355 nm, a precise measurement of powers of 100 mW and lower was impossible because of a problem concerning laser stability.

Figure 1:
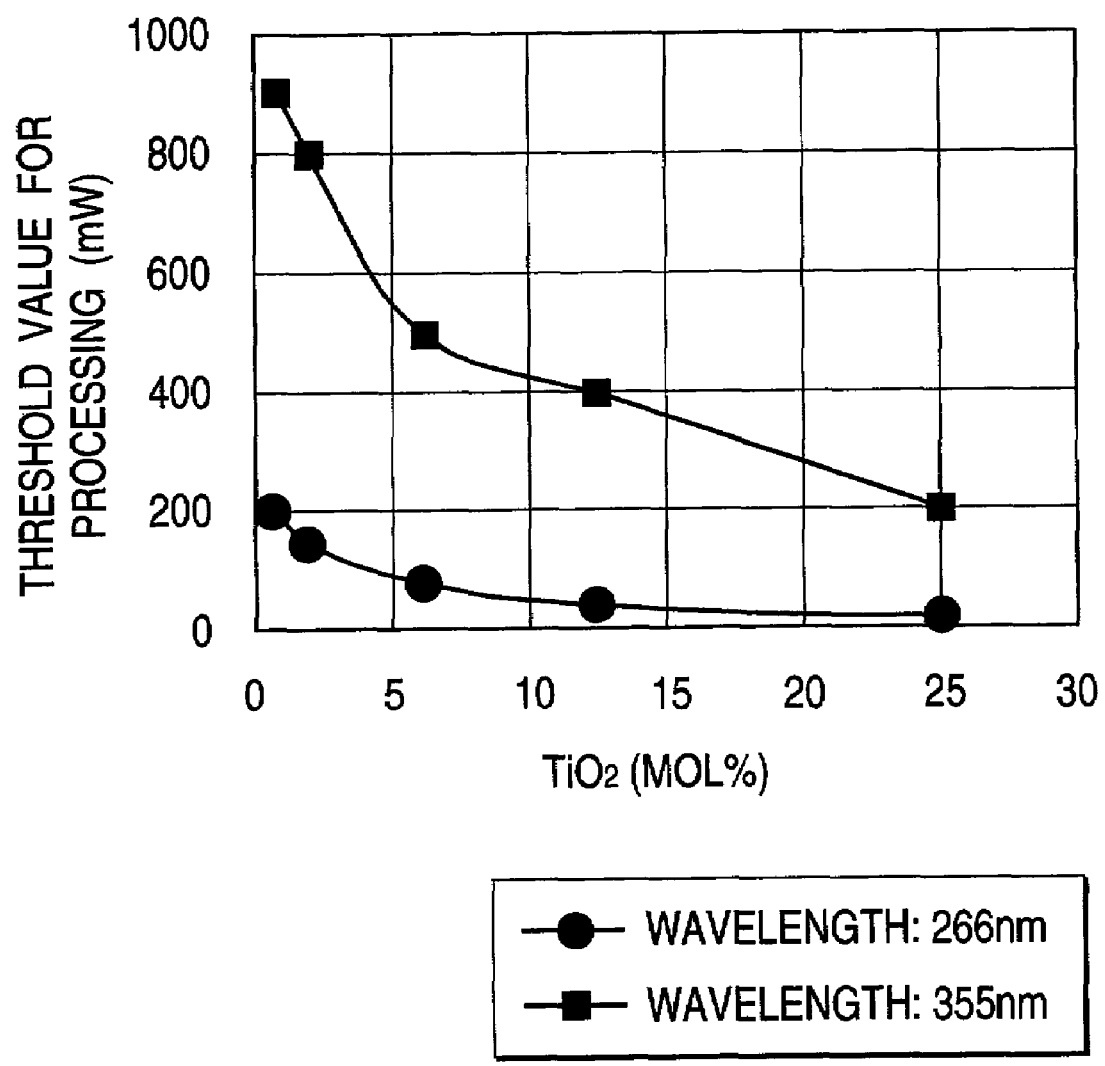
FIG. 1 is a graphic presentation showing the processability of glasses for laser processing according to the invention.

In Examples 1 to 5 in which the amounts of intermediate oxides were changed, the threshold value for processing decreased with increasing TiO amount as shown in FIG. 1. In Example 5 ($TiO_2$: 25 mol %), the threshold values for processing were as low as the measurement limits. In Examples 6 to 8, which employed compositions which were the same as in Example 5 except that the network-former oxides were changed without changing the $TiO_2$ amount, the threshold values remained unchanged and were not higher than the measurement limits even when the proportions of $SiO_2$ and $B_2O_3$, which are network-former oxides, were changed. In Examples 9 and 10, which employed compositions which were the same as in Example 5 except that the amount of a modifying oxide to be added was changed without changing the $TiO_2$ amount, the threshold values remained unchanged and were not higher than the measurement limits even when the amount of $Na_2O$, which is a modifying oxide, was changed. In Examples 11 and 12, in which the amounts of $SiO_2$ as a network-former oxide and $TiO_2$ as an intermediate oxide were changed considerably, the threshold values were lower than in Comparative Examples 1 and 2 despite these compositions, showing that the addition of titanium was effective. In Examples 13 to 18, which employed compositions which were the same as in Example 5 except that the kind of modifying oxide was varied without changing the $TiO_2$ amount, the threshold values remained unchanged and were not higher than the measurement limits even when the kind of modifying oxide was changed.

COMPARATIVE EXAMPLE 1

Raw materials were mixed in such a proportion as to result in the composition (mol %) shown in Table 4 to thereby produce a glass sample. This glass sample had a composition akin to those of the glass samples of Examples 1 to 5. However, when this sample was examined for threshold value for processing in the same manner as in the Examples, it underwent neither ablation nor vaporization upon irradiation with the laser light having a wavelength of 266 nm at a maximum power of 1,100 mW and upon irradiation with the laser light having a wavelength of 355 nm at a maximum power of 2,100 mW. Namely, this sample showed no change.

COMPARATIVE EXAMPLE 2

A material having the composition (mol %) shown in Table 5 was used as a Comparative Example. This material is the so-called soda-lime glass for use as ordinary window glasses. When this glass was examined for threshold value for processing in the same manner as in the Examples, it underwent neither ablation nor vaporization upon irradiation with the laser light having a wavelength of 266 nm at a maximum power of 1,100 mW and upon irradiation with the laser light having a wavelength of 355 nm at a maximum power of 2,100 mW. Namely, this glass showed no change.

TABLE 1

(unit: mol %)

| Component | Example 1 | Example 2 | Example 3 | Example 4 | Example 5 | Example 6 |
|---|---|---|---|---|---|---|
| $SiO_2$ | 37.2 | 36.7 | 37.5 | 37.5 | 37.5 | 50.0 |
| $B_2O_3$ | 12.4 | 12.3 | 12.5 | 12.5 | 12.5 | 0.0 |
| $TiO_2$ | 0.8 | 2.0 | 6.3 | 12.5 | 25.0 | 25.0 |
| $Al_2O_3$ | 24.8 | 24.5 | 18.7 | 12.5 | 0.0 | 0.0 |
| $Na_2O$ | 24.8 | 24.5 | 25.0 | 25.0 | 25.0 | 25.0 |
| $Li_2O$ | 0.0 | 0.0 | 0.0 | 0.0 | 0.0 | 0.0 |
| $K_2O$ | 0.0 | 0.0 | 0.0 | 0.0 | 0.0 | 0.0 |
| MgO | 0.0 | 0.0 | 0.0 | 0.0 | 0.0 | 0.0 |
| CaO | 0.0 | 0.0 | 0.0 | 0.0 | 0.0 | 0.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| Total | 100.0 | 100.0 | 100.0 | 100.0 | 100.0 | 100.0 |

| Component | Example 7 | Example 8 | Example 9 | Example 10 | Example 11 | Example 12 |
|---|---|---|---|---|---|---|
| $SiO_2$ | 25.0 | 0.0 | 10.0 | 30.0 | 20.0 | 79.0 |
| $B_2O_3$ | 25.0 | 50.0 | 30.0 | 10.0 | 0.0 | 0.0 |
| $TiO_2$ | 25.0 | 25.0 | 25.0 | 25.0 | 40.0 | 1.0 |
| $Al_2O_3$ | 0.0 | 0.0 | 0.0 | 0.0 | 0.0 | 0.0 |
| $Na_2O$ | 25.0 | 25.0 | 35.0 | 35.0 | 40.0 | 20.0 |
| $Li_2O$ | 0.0 | 0.0 | 0.0 | 0.0 | 0.0 | 0.0 |
| $K_2O$ | 0.0 | 0.0 | 0.0 | 0.0 | 0.0 | 0.0 |
| MgO | 0.0 | 0.0 | 0.0 | 0.0 | 0.0 | 0.0 |
| CaO | 0.0 | 0.0 | 0.0 | 0.0 | 0.0 | 0.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| Total | 100.0 | 100.0 | 100.0 | 100.0 | 100.0 | 100.0 |

| Component | Example 13 | Example 14 | Example 15 | Example 16 | Example 17 | Example 18 |
|---|---|---|---|---|---|---|
| $SiO_2$ | 37.5 | 37.5 | 37.5 | 37.5 | 37.5 | 37.5 |
| $B_2O_3$ | 12.5 | 12.5 | 12.5 | 12.5 | 12.5 | 12.5 |
| $TiO_2$ | 25.0 | 25.0 | 25.0 | 25.0 | 25.0 | 25.0 |
| $Al_2O_3$ | 0.0 | 0.0 | 0.0 | 0.0 | 0.0 | 0.0 |
| $Na_2O$ | 0.0 | 0.0 | 0.0 | 0.0 | 0.0 | 0.0 |
| $Li_2O$ | 25.0 | 0.0 | 0.0 | 0.0 | 0.0 | 0.0 |
| $K_2O$ | 0.0 | 25.0 | 0.0 | 0.0 | 0.0 | 0.0 |
| MgO | 0.0 | 0.0 | 25.0 | 0.0 | 0.0 | 0.0 |
| CaO | 0.0 | 0.0 | 0.0 | 25.0 | 0.0 | 0.0 |
| SrO | 0.0 | 0.0 | 0.0 | 0.0 | 25.0 | 0.0 |
| BaO | 0.0 | 0.0 | 0.0 | 0.0 | 0.0 | 25.0 |
| Total | 100.0 | 100.0 | 100.0 | 100.0 | 100.0 | 100.0 |

TABLE 2

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Threshold value for processing (mW) | 200 | 150 | 80 | 40 | 15 | 15 | 15 | 15 | 15 | 15 |

| | Example 11 | Example 12 | Example 13 | Example 14 | Example 15 | Example 16 | Example 17 | Example 18 |
|---|---|---|---|---|---|---|---|---|
| Threshold value for processing (mW) | 15 | 200 | 15 | 15 | 15 | 15 | 15 | 15 |

TABLE 3

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Threshold value for processing (mW) | 900 | 800 | 500 | 400 | 200 | 200 | 100 | 200 | 100 | 200 |

| | Example 11 | Example 12 | Example 13 | Example 14 | Example 15 | Example 16 | Example 17 | Example 18 |
|---|---|---|---|---|---|---|---|---|
| Threshold value for processing (mW) | 100 | 1100 | 200 | 200 | 200 | 200 | 200 | 200 |

TABLE 4

(unit: mol %)

| Component | Comparative Example 1 |
|---|---|
| $SiO_2$ | 37.5 |
| $TiO_2$ | 0.0 |
| $Al_2O_3$ | 25.0 |
| $Na_2O$ | 25.0 |
| $B_2O_3$ | 12.5 |
| Total | 100.0 |

TABLE 5

(unit: mol %)

| Component | Comparative Example 2 |
|---|---|
| $SiO_2$ | 72.0 |
| $Al_2O_3$ | 0.9 |
| $Na_2O$ | 12.7 |
| MgO | 6.0 |
| CaO | 8.4 |
| Total | 100.0 |

The results given above show the following. The addition of titanium to oxide glasses remarkably lowers the threshold value for processing with ultraviolet laser light. Furthermore, the threshold value for processing decreases as the titanium content increases. However, the threshold value depends little on the contents of network-former oxides or modifying oxides. Although the titanium in the glasses described above were expressed in the form of an oxide thereof, titanium produces the same effect even when it is present in the form of atoms, a colloid, or ions.

Since titanium can be added during glass melting, it is easy to regulate the amount of titanium to be added. Consequently, the threshold value for laser processing is easy to regulate. Furthermore, due to the titanium addition during glass melting, the glass has an even titanium concentration. Because of this, the glass to be processed has an even threshold value throughout and, hence, can be easily processed up to an inner part thereof to form, e.g., a through-hole therein.

According to the invention, a low-threshold glass which requires a smaller energy amount for processing can be obtained. Since titanium can be incorporated into a glass through melting, the threshold value can be easily regulated by changing the amount of titanium to be added. Furthermore, a material having evenness in processability can be obtained.

What is claimed is:

1. A glass that is suitable for laser processing, the laser processing including the process of absorbing UV laser light energy,
    the glass having a composition consisting of $SiO_2$, $B_2O_3$, $TiO_2$, and at least one of $Li_2O$, $Na_2O$, $K_2O$, $Rb_2O$, $Cs_2O$, MgO, and CaO, wherein:
    $20 \leq SiO_2 + B_2O_3 \leq 79$ mol %, where $SiO_2$ can be 0-69 mol % and where $B_2O_3$ can be 10-79 mol %,
    $5 \leq TiO_2 \leq 25$ mol %, and
    $5 \leq Li_2O + Na_2O + K_2O + Rb_2O + Cs_2O + MgO + CaO \leq 60$ mol %.

2. A glass that is suitable for laser processing, the laser processing including the process of absorbing UV laser light energy,
    the glass having a composition consisting of $SiO_2$, $B_2O_3$, $TiO_2$, and at least one of $Li_2O$, $Na_2O$, $K_2O$, $Rb_2O$, $Cs_2O$, MgO, and CaO, wherein:
    $20 \leq SiO_2 + B_2O_3 \leq 79$ mol %, wherein each of $SiO_2$ and $B_2O_3$ can be 0-79 mol %;
    $1 \leq TiO_2 \leq 40$ mol %;
    $5 \leq Li_2O + Na_2O + K_2O + Rb_2O + Cs_2O + MgO + CaO \leq 60$ mol %.

* * * * *